United States Patent
Gammel et al.

(10) Patent No.: US 6,925,178 B2
(45) Date of Patent: Aug. 2, 2005

(54) RETURNING RINGING SIGNALS THROUGH THE TIP AMPLIFIER OF SUBSCRIBER-LINE INTERFACE CIRCUITRY

(75) Inventors: John C. Gammel, Birdsboro, PA (US); David Chabinec, West Lawn, PA (US); Dean Umberger, Stouchsburg, PA (US)

(73) Assignee: Legerity, Inc., Austin, TX (US)

( * ) Notice: Subject to any disclaimer, the term of this patent is extended or adjusted under 35 U.S.C. 154(b) by 161 days.

(21) Appl. No.: 10/646,624

(22) Filed: Aug. 22, 2003

(65) Prior Publication Data

US 2004/0086106 A1 May 6, 2004

Related U.S. Application Data

(60) Provisional application No. 60/406,550, filed on Aug. 27, 2002.

(51) Int. Cl.$^7$ ................................................ H04M 9/08
(52) U.S. Cl. .......................... 379/413.01; 379/399.01; 379/382
(58) Field of Search ........................... 379/399.01, 382, 379/413.01

(56) References Cited

U.S. PATENT DOCUMENTS 5,517,565 A * 5/1996 Cotreau .................. 379/413.01
2004/0174985 A1 * 9/2004 Apfel ..................... 379/399.01

* cited by examiner

*Primary Examiner*—Jefferey Harold
(74) *Attorney, Agent, or Firm*—Steve Mendelsohn

(57) ABSTRACT

A subscriber-line interface circuit (SLIC) has tip and ring amplifiers connected to the tip and ring lines, respectively, of customer premises equipment (CPE). The SLIC returns the ringing signal (provided to the CPE from a power supply connected to the CPE's ring line), to ground or to battery, through the SLIC's tip amplifier. In one embodiment, the SLIC has three switches: S1 connecting the power supply to the ring line, S2 connecting the ring amp to the ring line, and S3 connecting the tip amp to the tip line. During ringing, S1 and S3 are closed to return the ringing signal to ground through the tip amp, which is preferably driven to saturation during ringing to reduce power consumption. By eliminating the fourth switch that appears in prior-art SLICs (e.g., connecting the tip line to ground), SLICs of the present invention can be smaller and therefore less expensive to implement.

28 Claims, 3 Drawing Sheets

RETURNING RINGING SIGNALS THROUGH THE TIP AMPLIFIER OF SUBSCRIBER-LINE INTERFACE CIRCUITRY

CROSS-REFERENCE TO RELATED APPLICATIONS

This application claims the benefit of the filing date of U.S. provisional application No. 60/406,550, filed on Aug. 27, 2002.

BACKGROUND OF THE INVENTION

1. Field of the Invention

The present invention relates to telecommunications, and, in particular, to subscriber-line interface circuits (SLICs) for telephones and other customer premises equipment (CPE).

2. Description of the Related Art

When located at a central office (CO), subscriber-line interface circuits provide the electrical interface between the CO and its customers' telephones and/or other CPE. FIG. 1 shows a high-level schematic diagram of a portion of a prior-art SLIC 100 used to support telecommunications services for an individual customer.

In particular, FIG. 1 shows tip amplifier 102 and ring amplifier 104, which are connected between the rest of the SLIC's audio-feeding circuitry 106 and tip and ring lines 108 and 110, respectively, which lines provide the electrical connection to the customer's CPE. Connected between tip line 108 and tip amp 102 is switch S3, while switch S4 switchably connects tip line 108 to ground. Similarly, connected between ring line 110 and ring amp 104 is switch S2, while switch S1 switchably connects ring line 110 to ground through ringing power supply 112, which, according to a conventional analog POTS (plain old telephone service) signaling protocol, provides ringing and a 48V DC voltage offset between ground and one side of switch S1. Depending on the implementation, the voltage applied to switch S1 by power supply 112 may be either positive or negative.

When the customer's CPE is on hook, the CPE is configured such that tip and ring lines 108 and 110 form an open circuit path through the CPE. When the customer's CPE is off hook, the configuration of CPE changes such that tip and ring lines 108 and 110 form a closed circuit path though the CPE. When a call is placed to the customer's CPE (e.g., when the CPE is on hook), SLIC 100 provides a ringing signal to the CPE via ring line 110, which signal returns to SLIC 100 (e.g., when the CPE goes off hook) via tip line 108.

During ringing, switches S1 and S4 are closed, and switches S2 and S3 are open. As such, the ringing voltage from power supply 112 is applied to the customer's CPE via ring line 110. The ringing signal is an intermittent AC signal (e.g., 88V rms) superimposed by power supply 112 on the 48V DC voltage offset.

When the CPE goes off hook (e.g., when the customer answer his/her phone), tip and ring lines 108 and 110 are connected via the CPE, which starts to draw DC current from power supply 112. Depending on the implementation, the ringing signal should be returned to the SLIC via tip line 108 either to ground or to battery. For example, in prior-art SLIC 100, the ringing signal is returned to ground via switch S4.

When the SLIC detects that the CPE is off hook (e.g., by detecting the DC current drawn from power supply 112), switches S1 and S4 are opened, and switches S2 and S3 are closed to connect tip and ring lines 108 and 110 to receive the audio signals provided by audio-feeding circuitry 106 via tip and ring amps 102 and 104, respectively.

In the past, switches S1–S4 were implemented using a double-pull, double-throw electro-mechanical relay having four poles. In more modern, integrated-circuit implementations, each of switches S1–S4 is implemented as a set of one or more relatively large transistors that are capable of handling the voltages involved in analog POTS service.

SUMMARY OF THE INVENTION

In accordance with the principles of the present invention, subscriber-line interface circuitry returns the ringing signal (to ground or to battery, depending on the implementation) via the tip amplifier. As such, SLIC circuitry can be implemented using only three of the four switches used in prior-art SLIC circuitry. (For example, in the context of SLIC 100 of FIG. 1, by returning the ringing signal to ground via the tip amp, switch S4 is not needed and can be eliminated from the circuitry.) Since one of the switches is eliminated, SLIC circuitry of the present invention can be smaller and therefore cheaper to implement.

In one embodiment, the present invention is subscriber-line interface circuitry (SLIC) for connecting customer premises equipment (CPE) to a telecommunications network via a tip-and-ring line pair. The SLIC comprises audio-feeding circuitry and ringing circuitry. The audio-feeding circuitry is adapted to transmit and receive audio signals to and from the CPE via the tip and ring lines. The ringing circuitry is adapted to provide a ringing signal to the CPE via the ring line. An output side of the audio-feeding circuitry includes a tip amplifier adapted to be connected to the tip line. The SLIC is adapted to return the ringing signal from the CPE via the tip line and through the tip amplifier.

In another embodiment, the present invention is, in a telecommunications network, a method for interfacing with customer premises equipment (CPE) via a tip-and-ring line pair. A ringing signal is provided to the CPE via the ring line. The ringing signal is received from the CPE via the tip line, wherein the ringing signal is returned through a tip amplifier of a SLIC of the telecommunications network.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
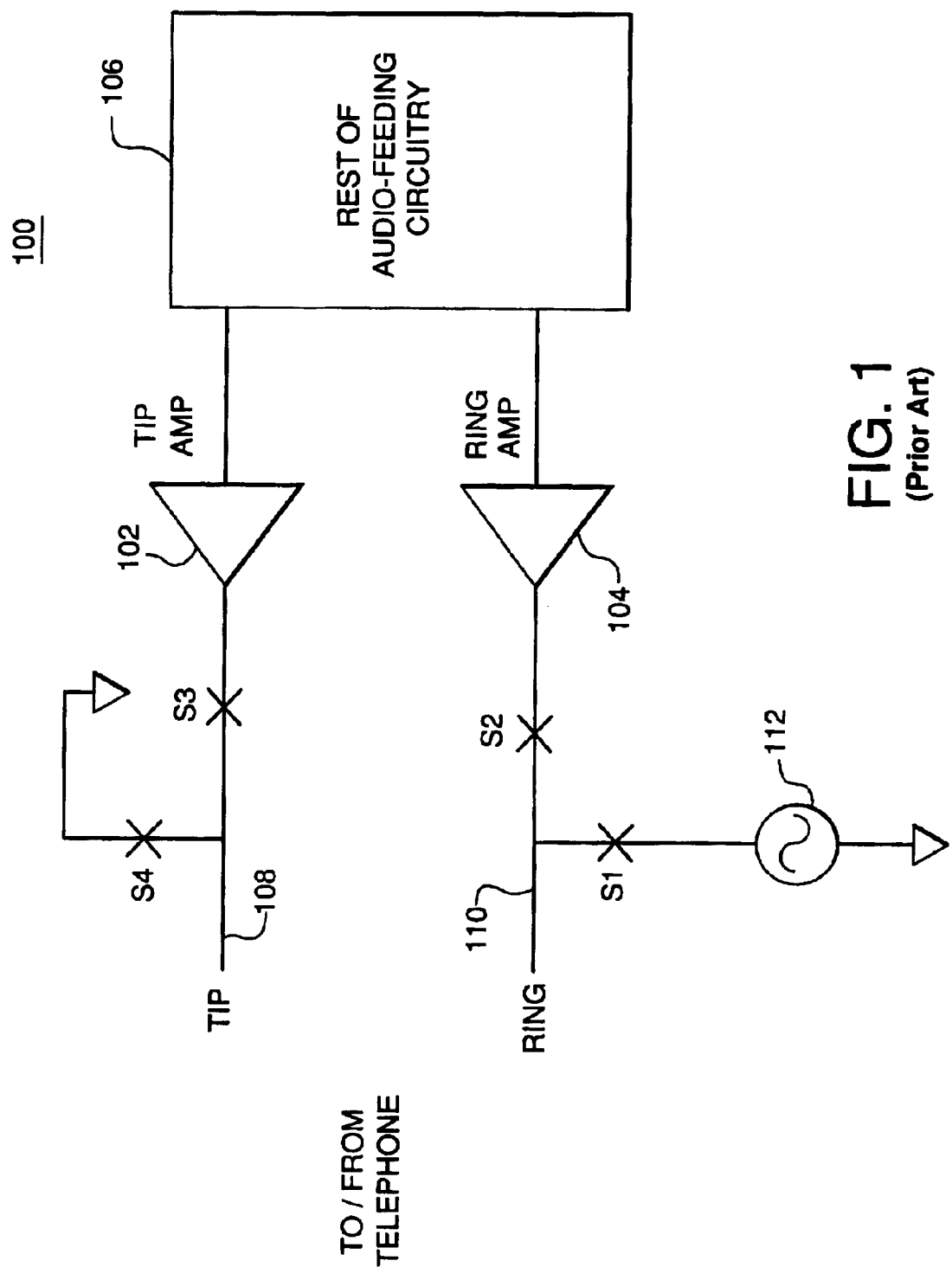
FIG. 1 shows a high-level schematic diagram of a portion of a prior-art subscriber-line interface circuit (SLIC) used to support telecommunications services for a particular customer.
Figure 2:
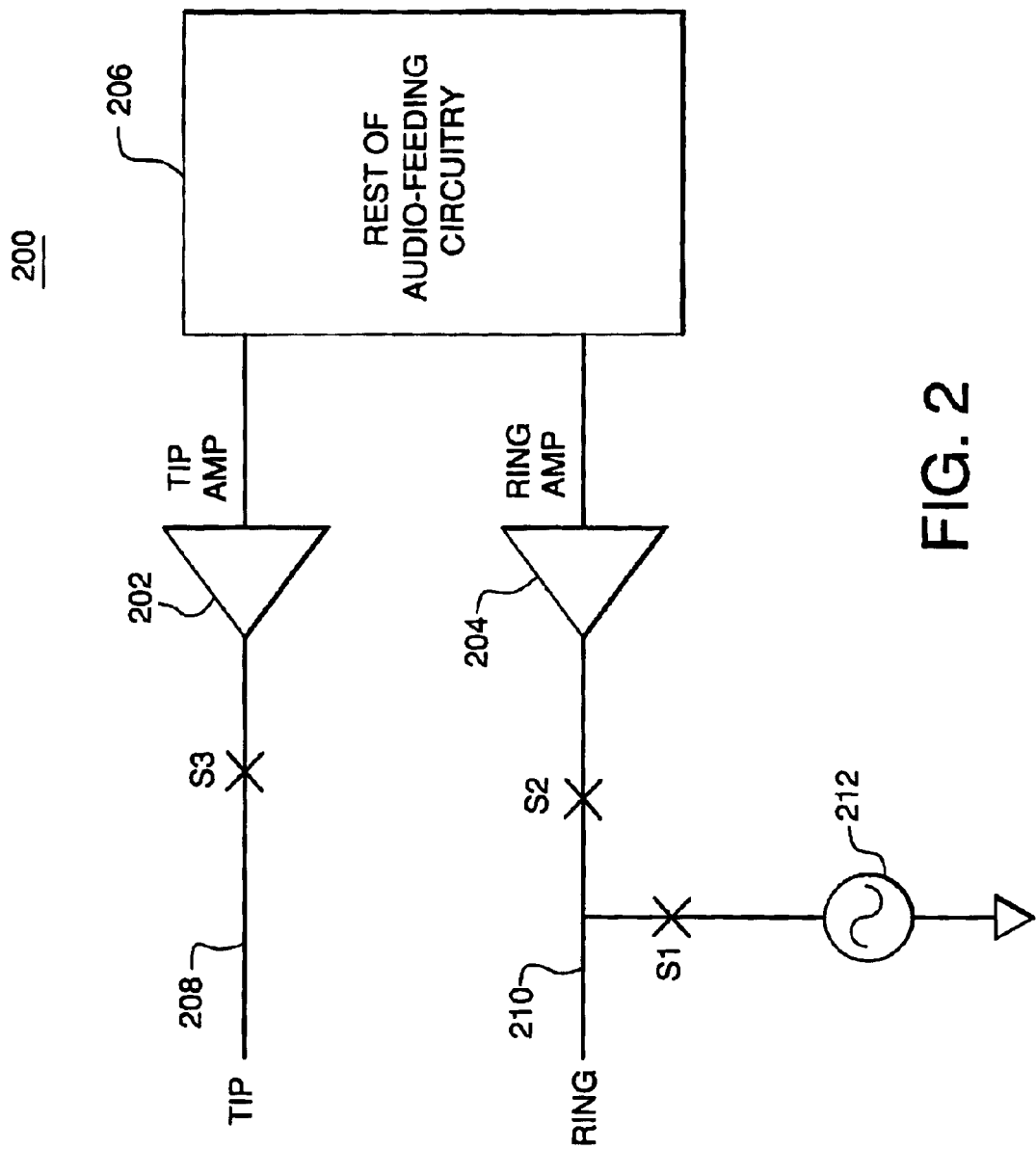
FIG. 2 shows a high-level schematic diagram of a portion of a SLIC, according to one embodiment of the present invention.

FIG. 2 shows a high-level schematic diagram of a portion of a subscriber-line interface circuit 200, according to one embodiment of the present invention. Like SLIC 100 of FIG. 1, SLIC 200 has a tip amp 202 and a ring amp 204 connected between the rest of the SLIC's audio-feeding circuitry 206 and tip and ring lines 208 and 210, respectively, via switches S3 and S2. Moreover, like SLIC 100, SLIC 200 has a power supply 212 connected between ground and ring line 210 via a switch S1. Those skilled in the art will appreciate that SLIC 200 has additional circuitry that supports the overall functionality of the SLIC. The elements shown in FIG. 2 are intended to illustrate the present invention and are not intended to be a complete depiction of the SLIC's circuitry.

One difference between SLIC 100 and SLIC 200 is the absence of a fourth switch (analogous to switch S4 of FIG. 1) connecting tip line 208 to ground (or to battery). According to embodiments of the present invention, depending on the implementation, the ringing signal is returned from tip line 208 to ground or to battery through tip amp 202.

In particular, during ringing, switches S1 and S3 are closed, and switch S2 is open, such that, when the customer's CPE goes off hook, the ringing signal provided to the CPE from power supply 212 via ring line 210 is returned from the CPE via tip line 208, through switch S3, and into tip amp 202. When SLIC 200 detects that the CPE went off hook, switch S1 is opened, and switch S2 is closed to connect the CPE to the SLIC's audio-feeding circuitry. In a preferred implementation, in order to reduce power consumption, tip amp 202 is driven to saturation (either to ground or to battery) during ringing.

Figure 3:
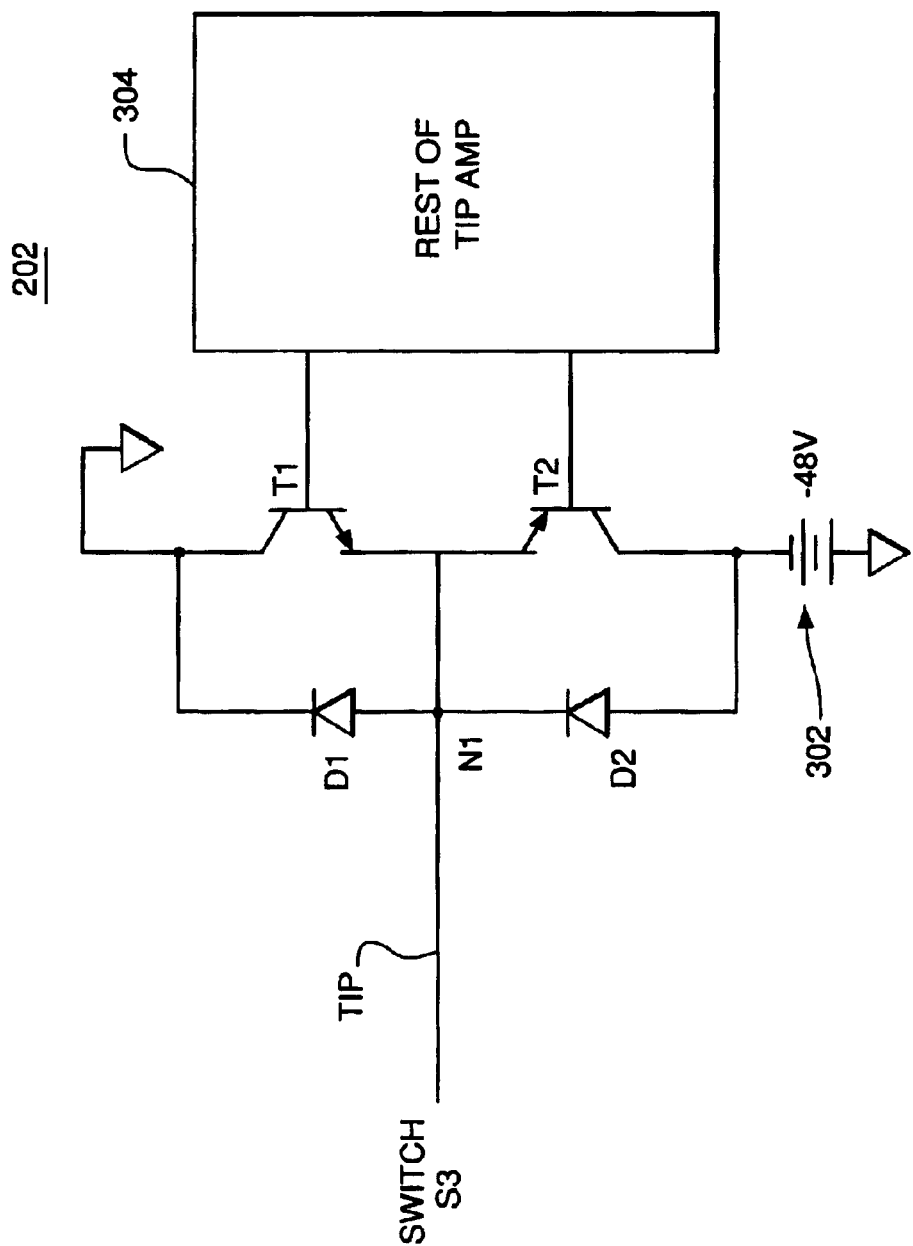
FIG. 3 shows a schematic diagram of the front end of the tip amp of FIG. 2.

FIG. 3 shows a schematic diagram of the front end of tip amp 202 of FIG. 2, according to one embodiment of the present invention. In particular, FIG. 3 shows circuitry (comprising transistors T1 and T2, diodes D1 and D2, and DC power supply 302) connected between switch S3 of FIG. 2 (at node N1) and the rest of tip amp 202 (304).

In one mode of operation, during ringing, transistor T1 is turned on and transistor T2 is turned off. As such, the ringing signal returned from the customer's CPE via tip line 208 of FIG. 2 via switch S3 will be driven to ground through diode D1. When the ringing signal is drawing current from the SLIC, the current flows from ground through transistor T1.

In another mode of operation in which the ringing signal is returned to battery, transistor T1 would be turned off and transistor T2 would be turned on. In that case, when the ringing signal is providing current to the SLIC, the current flows through transistor T2 to ground via DC power supply 302. When the ringing signal is drawing current from the SLIC, the current flows from ground via DC power supply 302 through diode D2.

Although FIG. 3 shows circuitry that supports two different modes of operation in which the ringing signal can be returned to either ground or to battery, in alternative implementations, only one of these return options might be supported.

The present invention has been described in the context of circuitry having three switches S1, S2, and S3, as in FIG. 2. In an alternative embodiment, switch S3 may be eliminated (e.g., when there is no need to ever disconnect tip line 208 from tip amp 202).

The present invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. Subscriber-line interface circuitry (SLIC) for connecting customer premises equipment (CPE) to a telecommunications network via a tip-and-ring line pair, comprising:
    audio-feeding circuitry adapted to transmit and receive audio signals to and from the CPE via the tip and ring lines; and
    ringing circuitry adapted to provide a ringing signal to the CPE via the ring line, wherein:
        an output side of the audio-feeding circuitry includes a tip amplifier adapted to be connected to the tip line; and
        the SLIC is adapted to return the ringing signal from the CPE via the tip line and through the tip amplifier.

2. The invention of claim 1, wherein the SLIC comprises:
    a first switch connected to provide a selectable connection between a ringing signal source and the ring line; and
    a second switch connected to provide a selectable connection between an output of a ring amplifier of the audio-feeding circuitry and the ring line, wherein, during ringing, the first switch is closed, such that the ringing signal from the ringing signal source is returned through the tip amplifier.

3. The invention of claim 2, wherein, during ringing, the second switch is open.

4. The invention of claim 2, wherein the SLIC further comprises a third switch connected to provide a selectable connection between an output of the tip amplifier and the tip line, wherein, during ringing, the third switch is closed.

5. The invention of claim 1, wherein the ringing signal is returned to ground voltage through the tip amplifier.

6. The invention of claim 1, wherein the ringing signal is returned to battery voltage through the tip amplifier.

7. The invention of claim 1, wherein the tip amplifier is driven into saturation during ringing.

8. The invention of claim 7, wherein the tip amplifier is driven to saturation at ground voltage during ringing.

9. The invention of claim 7, wherein the tip amplifier is driven to saturation at battery voltage during ringing.

10. The invention of claim 1, wherein the tip amp comprises:
    a first diode D1 connected between a tip signal node N1 and a ground voltage and oriented to allow current to flow from the tip signal node to the ground voltage;

a first transistor T1, whose channel terminals are connected between the tip signal node and the ground voltage;

a second diode D2 connected between the tip signal node and a battery voltage and oriented to allow current to flow from the battery voltage to the tip signal node; and a second transistor T1, whose channel terminals are connected between the tip signal node and the battery voltage.

11. The invention of claim 10, wherein, during ringing, the first transistor is turned on and the second transistor is turned off to return the ringing signal to the ground voltage.

12. The invention of claim 10, wherein, during ringing, the first transistor is turned off and the second transistor is turned on to return the ringing signal to the battery voltage.

13. The invention of claim 1, wherein the SLIC is implemented in an integrated circuit.

14. The invention of claim 1, wherein:
the SLIC comprises:
a first switch connected to provide a selectable connection between a ringing signal source and the ring line;
a second switch connected to provide a selectable connection between an output of a ring amplifier of the audio-feeding circuitry and the ring line; and
a third switch connected to provide a selectable connection between an output of the tip amplifier and the tip line, wherein, during ringing, the first and third switches are closed and the second switch is open, such that the ringing signal from the ringing signal source is returned through the tip amplifier;
the tip amplifier is driven into saturation during ringing; and
the tip amp comprises:
a first diode D1 connected between a tip signal node N1 and a ground voltage and oriented to allow current to flow from the tip signal node to the ground voltage;
a first transistor T1, whose channel terminals are connected between the tip signal node and the ground voltage;
a second diode D2 connected between the tip signal node and a battery voltage and oriented to allow current to flow from the battery voltage to the tip signal node; and
a second transistor T1, whose channel terminals are connected between the tip signal node and the battery voltage, wherein:
in a first mode of operation, during ringing, the first transistor is turned on and the second transistor is turned off to return the ringing signal to the ground voltage; and
in a second mode of operation, during ringing, the first transistor is turned off and the second transistor is turned on to return the ringing signal to the battery voltage.

15. In a telecommunications network, a method for interfacing with customer premises equipment (CPE) via a tip-and-ring line pair, comprising:
providing a ringing signal to the CPE via the ring line; and
receiving the ringing signal from the CPE via the tip line, wherein the ringing signal is returned through a tip amplifier of subscriber-line interface circuitry (SLIC) of the telecommunications network.

16. The invention of claim 15, wherein the SLIC comprises:
a first switch connected to provide a selectable connection between a ringing signal source and the ring line; and a second switch connected to provide a selectable connection between an output of a ring amplifier of the audio-feeding circuitry and the ring line, wherein, during ringing, the first switch is closed, such that the ringing signal from the ringing signal source is returned through the tip amplifier.

17. The invention of claim 16, wherein, during ringing, the second switch is open.

18. The invention of claim 16, wherein the SLIC further comprises a third switch connected to provide a selectable connection between an output of the tip amplifier and the tip line, wherein, during ringing, the third switch is closed.

19. The invention of claim 15, wherein the ringing signal is returned to ground voltage through the tip amplifier.

20. The invention of claim 15, wherein the ringing signal is returned to battery voltage through the tip amplifier.

21. The invention of claim 15, wherein the tip amplifier is driven into saturation during ringing.

22. The invention of claim 21, wherein the tip amplifier is driven to saturation at ground voltage during ringing.

23. The invention of claim 21, wherein the tip amplifier is driven to saturation at battery voltage during ringing.

24. The invention of claim 15, wherein the tip amp comprises:
a first diode D1 connected between a tip signal node N1 and a ground voltage and oriented to allow current to flow from the tip signal node to the ground voltage;
a first transistor T1, whose channel terminals are connected between the tip signal node and the ground voltage;
a second diode D2 connected between the tip signal node and a battery voltage and oriented to allow current to flow from the battery voltage to the tip signal node; and
a second transistor T1, whose channel terminals are connected between the tip signal node and the battery voltage.

25. The invention of claim 24, wherein, during ringing, the first transistor is turned on and the second transistor is turned off to return the ringing signal to the ground voltage.

26. The invention of claim 24, wherein, during ringing, the first transistor is turned off and the second transistor is turned on to return the ringing signal to the battery voltage.

27. The invention of claim 15, wherein the SLIC is implemented in an integrated circuit.

28. The invention of claim 15, wherein:
the SLIC comprises:
a first switch connected to provide a selectable connection between a ringing signal source and the ring line;
a second switch connected to provide a selectable connection between an output of a ring amplifier of the audio-feeding circuitry and the ring line; and
a third switch connected to provide a selectable connection between an output of the tip amplifier and the tip line, wherein, during ringing, the first and third switches are closed and the second switch is open, such that the ringing signal from the ringing signal source is returned through the tip amplifier;
the tip amplifier is driven into saturation during ringing; and
the tip amp comprises:
a first diode D1 connected between a tip signal node N1 and a ground voltage and oriented to allow current to flow from the tip signal node to the ground voltage;
a first transistor T1, whose channel terminals are connected between the tip signal node and the ground voltage;

a second diode D2 connected between the tip signal node and a battery voltage and oriented to allow current to flow from the battery voltage to the tip signal node; and a second transistor T1, whose channel terminals are connected between the tip signal node and the battery voltage, wherein:

in a first mode of operation, during ringing, the first transistor is turned on and the second transistor is turned off to return the ringing signal to the ground voltage; and in a second mode of operation, during ringing, the first transistor is turned off and the second transistor is turned on to return the ringing signal to the battery voltage.

* * * * *